No. 828,255. PATENTED AUG. 7, 1906.
G. H. TARLETON.
DRAFT REGULATOR.
APPLICATION FILED JULY 10, 1905.

WITNESSES
M. V. Foley.
R. E. Brewer

INVENTOR
Geo. H. Tarleton
by Charles Raymond Brown
his attorney

UNITED STATES PATENT OFFICE.

GEORGE H. TARLETON, OF BOSTON, MASSACHUSETTS, ASSIGNOR OF ONE-HALF TO SMITH & ANTHONY COMPANY, OF BOSTON, MASSACHUSETTS, A CORPORATION OF MASSACHUSETTS.

DRAFT-REGULATOR.

No. 828,255.　　　Specification of Letters Patent.　　　Patented Aug. 7, 1906.

Application filed July 10, 1905. Serial No. 268,922.

*To all whom it may concern:*

Be it known that I, GEORGE H. TARLETON, a citizen of the United States, residing at Boston, in the county of Suffolk and State of Massachusetts, have invented a new and useful Improvement in Draft-Regulators, of which the following is a full, clear, and exact description, reference being had to the accompanying drawings, forming a part of this specification, in explaining its nature.

My invention relates to an improvement in that kind of draft-regulator for controlling the draft of the smoke or exit passage of a stove, furnace, or heater in which the pipe-damper which ordinarily controls such passage is caused to be moved simultaneously with a damper or slide employed for controlling a cold-air inlet or opening made in the pipe forming said passage beyond the pipe-damper. This cold-air damper or slide has the same relative degree of motion as the pipe-damper, but acts with a reverse order of operation, for as the pipe-damper is closed or partially closed the cold-air damper or slide is opened or partially opened, and vice versa. The operation is thus in order that the draft upon the fire-pot may be eliminated as much as possible when the pipe-damper is closed and the cold-air damper or slide open or proportionately eliminated depending upon the position of the dampers as respects their degree of opening or closure up to the point where, with the pipe-damper open and the cold-air damper or slide tightly closed, connection with the outside air is entirely cut off and as perfect a draft as possible secured.

The special object of my invention is to so arrange and connect the dampers that they may be made to properly operate together by as simple a means as possible.

Figure 1:
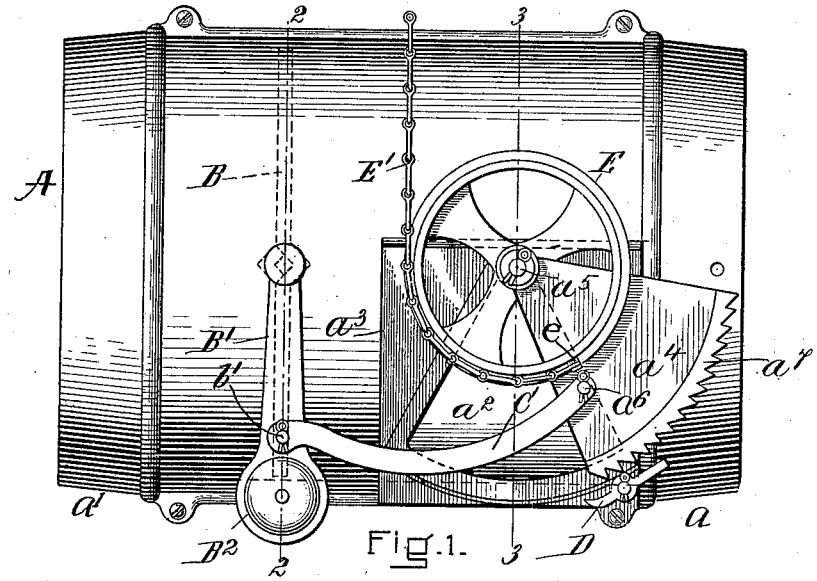
Figure 2:
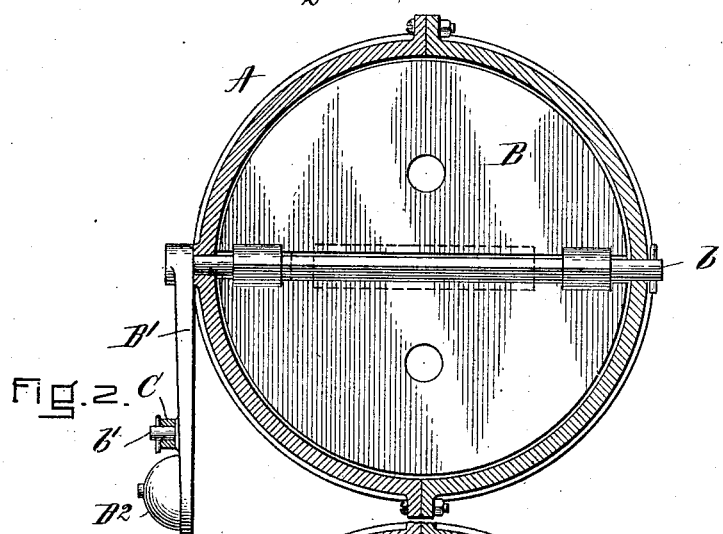
Figure 3:
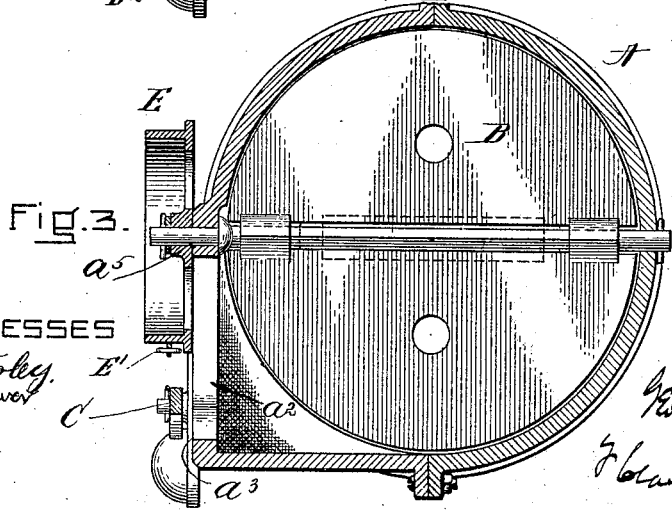

Referring to the drawings, in which the means or device comprising my invention can best be seen and understood, Figure 1 shows the device in side elevation. Fig. 2 shows a cross-section on the line 2 2 of Fig. 1, and Fig. 3 shows a cross-section on the line 3 3 of Fig. 1.

In the drawings, A represents a tubular pipe-section or thimble adapted to be placed in the smoke or exit pipe of a stove, furnace, or heater, the disconnected ends of the pipe making connection with the thimble by being pressed onto its respective flanged ends $a$ $a'$ in the usual manner. Within the thimble A is arranged a damper B, turning on a spindle $b$, having bearings within the wall of the thimble. This damper, it is to be noted, is the common pipe-damper used as the ordinary means for obtaining draft regulation. Supplementing this pipe-damper I have shown some little distance beyond it a cold-air inlet or opening $a^2$, made through the wall of the thimble. This opening is of sector-like form cut transversely through the thimble. The opening is not made through the rounding wall of the thimble, but the rounding wall of the thimble is built out, as it were, presenting a flat side $a^3$, in which the opening or inlet is made. By so flattening the wall of the thimble it is best prepared to receive the swinging damper or slide $a^4$, which, having the form of a segment, is journaled to the flattened wall of the thimble at the point $a^5$, so as to normally hang down and cover the cold-air opening or inlet; but it may be turned or swung back so as to leave the inlet or opening partially or wholly open.

Of course the cold-air inlet, with its controlling damper or slide, supplements the action of the pipe-damper in regulating the draft, as has heretofore been done. Of this mode of operation explanation has already been made. It is necessary, however, in order to secure the best draft regulation, for the pipe-damper and the damper or slide controlling the cold-air inlet to coact uniformly. In other words, any variation in the degree of closure or opening of the one should simultaneously be attended with a relatively corresponding but reverse degree of opening or closure of the other. Not only this, but it is also desirable to employ such means or device that the dampers may be controlled simply by drawing upon a single cord or chain, for the dampers are oftentimes automatically controlled by a thermostat, and it is a great advantage to have an arrangement permitting of the dampers being so operated or controlled. I have accordingly extended the end of the spindle $b$ carrying the pipe-damper through the wall of the thimble and arranged upon the end projecting outside the thimble an arm B'. This arm extends perpendicularly to the spindle on the same line with the pipe-damper and is weighted or carries upon its end a weight $B^2$, by which it will be made to assume a vertical position, so that the pipe-damper will be normally closed. Pivoted to this arm at a point $b'$ some little distance away from where it makes its connection with the spindle is a link C, which connects with the side of the cold-air damper or slide. The length of this connecting-link and the point $a^6$, where it makes attachment with the cold-air damper or slide, is such that said cold-air damper or slide will be held open when the pipe-damper is closed, or when the pipe-damper is fully open or at any intermediate degree of opening the cold-air damper or slide will, by means of the connecting-link, have the same relative degree of closure. Moreover, it is to be noted that the arrangement of the parts is such that this connection may easily be made. As was before explained, the normal position of the pipe-damper is to remain closed, being so held by the weighted arm, and in consequence the cold-air damper or slide is held wide open. For holding the dampers in an intermediate position of opening or closure, as against the moving tendency of the weighted arm, I have pivoted to the flat side of the thimble a dog D, which is adapted to engage with the teeth $a^7$ on the under edge of the cold-air damper. By the engagement of the dog with these teeth a graduated holding or adjustment of the dampers is obtained. Upon tripping the dog the parts resume their normal position, as aforesaid. For the purpose especially of enabling the dampers thus connected and arranged to be operated by a single cord or chain from a thermostatic device I have provided the cold-air damper with a circular drum or rim E. Fastened to this drum or rim at the point $e$ is a cord or chain E', which is passed or turned around the drum so far that by simply drawing upon the chain by a short, light, and even pull, as may be obtained from a thermostatic device, the dampers may be made to operate together. The weighted arm is of course an essential factor in obtaining such an adjustment of the dampers, for its tendency to hold the dampers in a normal position is simply counteracted by the drawing stress of the chain, with the effect that the dampers are turned and held at any point of adjusted position, dependent upon the distance of movement or amount of drawing stress. Upon releasing the drawing stress the parts of course return to their normal position. Besides this capability for being operated by a cord or chain, the drum or circular rim E offers a very convenient means for operating the dampers by hand—a manner in which they are especially adapted to be operated.

Having thus fully described my invention, I claim and desire to secure by Letters Patent of the United States—

In combination with a smoke or exit pipe of a stove, furnace or heater, of a draft-regulating device forming a part thereof, the same comprising a thimble, a spindle within said thimble, and a pipe-damper arranged to turn in the thimble upon the same, a weighted arm on said spindle outside of said thimble so disposed as to hold the damper normally closed, said thimble having a cold-air inlet leading into the passage of the thimble beyond said pipe-damper, a swinging damper or slide pivoted to the wall of said thimble for controlling the cold-air inlet, a link connecting said weighted arm with said swinging damper or slide, whereby with said pipe-damper closed, the swinging damper may be held open, and vice versa, and means comprising a pulley or sector-piece attached to said swinging damper to provide for operation of the same.

GEORGE H. TARLETON.

In presence of—
M. V. FOLEY,
J. E. R. HAYES.